United States Patent
Stimson et al.

(10) Patent No.: US 11,027,594 B2
(45) Date of Patent: Jun. 8, 2021

(54) HEATED PLASTIC FLUID LINES FOR THERMAL SYSTEMS IN A HYBRID ELECTRIC VEHICLE (H/EV) AND USE THEREOF

(71) Applicant: TI GROUP AUTOMOTIVE SYSTEMS LLC, Auburn Hills, MI (US)

(72) Inventors: Thomas Stimson, Auburn Hills, MI (US); Alastair Deane, Rochester Hills, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 0 days.

(21) Appl. No.: 16/471,197

(22) PCT Filed: Dec. 21, 2017

(86) PCT No.: PCT/IB2017/058311
§ 371 (c)(1),
(2) Date: Jun. 19, 2019

(87) PCT Pub. No.: WO2019/122983
PCT Pub. Date: Jun. 27, 2019

(65) Prior Publication Data
US 2020/0391573 A1    Dec. 17, 2020

(51) Int. Cl.
*B60H 1/22*       (2006.01)
*H01M 10/615*   (2014.01)
(Continued)

(52) U.S. Cl.
CPC ....... *B60H 1/2221* (2013.01); *B60H 1/00278* (2013.01); *F16L 11/08* (2013.01);
(Continued)

(58) Field of Classification Search
CPC .............. B60H 1/2221; B60H 1/00278; B60H 2001/00307; F16L 53/38; F16L 11/08;
(Continued)

(56) References Cited

U.S. PATENT DOCUMENTS

2013/0111932 A1*  5/2013  Mishima ................. B60L 58/27
                                                                        62/79
2013/0330065 A1* 12/2013  Schwarzkopf ........ F01N 3/2066
                                                                        392/468
(Continued)

FOREIGN PATENT DOCUMENTS

EP          3089257 A1    11/2016
JP       2012059371 A      3/2012
(Continued)

OTHER PUBLICATIONS

European Patent Office, Rijswijk, Netherlands, International Search Report of International Application No. PCT/IB2017/058311, dated Sep. 27, 2018, 3 pages.

*Primary Examiner* — Shawntina T Fuqua
(74) *Attorney, Agent, or Firm* — Dickinson Wright PLLC

(57) ABSTRACT

Heated plastic lines in a hybrid/electric vehicle (H/EV) in which a vehicle chassis thermal loop, component thermal loop, motor drive, and power electronics are coupled together and used in either a serial or parallel configuration. The vehicle chassis thermal loop includes a fluid, a circulation pump, and one or more lines through which the fluid flows. The component thermal loop includes the fluid and one or more lines in contact with the component through or around which the fluid flows. At least one of the vehicle chassis thermal loop and component thermal loop has at least a portion of the one or more lines being a plastic heated line. The plastic heated line is configured to heat the fluid to
(Continued)

a temperature that is at or above a cold operating temperature predetermined for the component.

8 Claims, 7 Drawing Sheets

(51) Int. Cl.
    *H01M 10/625* (2014.01)
    *H01M 10/6568* (2014.01)
    *H01M 10/66* (2014.01)
    *F16L 53/38* (2018.01)
    *B60H 1/00* (2006.01)
    *F16L 11/08* (2006.01)

(52) U.S. Cl.
    CPC .......... *F16L 53/38* (2018.01); *H01M 10/615* (2015.04); *H01M 10/625* (2015.04); *H01M 10/6568* (2015.04); *H01M 10/66* (2015.04); *H01M 2220/20* (2013.01)

(58) Field of Classification Search
    CPC ............. H01M 10/625; H01M 10/615; H01M 10/6568; H01M 10/66; H01M 2220/20; Y02E 60/10; Y02T 10/7072; Y02T 10/70; Y02T 90/14; B60L 2240/36; B60L 2240/545; B60L 1/003; B60L 1/02
    See application file for complete search history.

(56) References Cited

U.S. PATENT DOCUMENTS

| | | |
|---|---|---|
| 2016/0318409 A1 | 11/2016 | Rawlinson |
| 2017/0106724 A1 | 4/2017 | Porras et al. |
| 2018/0141458 A1* | 5/2018 | Jammoul ................ B60L 58/26 |

FOREIGN PATENT DOCUMENTS

| | | |
|---|---|---|
| JP | 2013208569 A | 10/2013 |
| JP | 2014158393 A | 8/2014 |
| WO | 2017033412 A1 | 3/2017 |

* cited by examiner

HEATED PLASTIC FLUID LINES FOR THERMAL SYSTEMS IN A HYBRID ELECTRIC VEHICLE (H/EV) AND USE THEREOF

CROSS REFERENCE TO RELATED APPLICATIONS

This application claims priority to PCT/IB2017/058311, filed Dec. 21, 2017, the entire contents of which is incorporated herein by reference in its entirety.

FIELD

This disclosure relates to hybrid/electric vehicles (H/EVs) and full electric vehicles (EVs) and for thermal management systems integrated with a vehicle's of power electronics, battery, and motor drives.

BACKGROUND

The statements in this section merely provide background information related to the present disclosure and may not constitute prior art. Electric vehicles represent one of the most promising alternatives to conventional vehicles that use internal combustion engines. However, since electric vehicles rely upon the use of rechargeable batteries, they must also include an efficient thermal management system that ensures each powertrain component remains within its optimum operating temperature range, specifically the battery pack.

Hybrid/Electric Vehicles (H/EVs) have a specific defined zone of temperature control for optimizing battery efficiency and lifetime. Vehicle manufacturers use thermal systems to heat and cool the battery within the operating temperature condition of 70° C.±10° C., while also maintaining a cell-to-cell temperature zone variation in the range of 3° C. to 5° C. A traditional battery system uses glycol-based fluids or AC refrigerant fluids for thermal optimization. H/EV batteries exhibit a cold start or cold operating temperature issue that requires the heating of the fluid at initial start-up. The goal at initial start-up is to ramp up heat in the battery to a controlled state as fast as possible. Conventional practice is to place a heating element within the battery pack. However, battery manufacturers would prefer not to use electrical voltage to power a heater as it withdraws driving capacity. Furthermore, an internal heating element takes up important packaging space as power density in a given size is an important design parameter.

SUMMARY

The present disclosure generally provides a thermal management system for powertrain components used in hybrid/electric vehicles (H/EVs) having a vehicle chassis thermal loop that includes a fluid, a circulation pump, and one or more lines through which the fluid flows. The thermal management system allows for efficient start-up and performance optimization under cold operating (i.e., environmental) conditions.

According to one aspect of the present disclosure, the thermal management system comprises a component thermal loop coupled with the vehicle chassis thermal loop. The component thermal loop also includes one or more lines through which the fluid flows and is in contact with the battery pack, power electronics, and/or motor drives. At least one of the vehicle chassis thermal loop and component thermal loop includes at least a portion of the one more lines being a plastic heated line that is configured to heat the fluid to a temperature that is at or above a cold operating temperature predetermined for the powertrain component; alternatively, the battery pack. The heating of the fluid in the plastic heated line may be initiated by an external action, including but not limited to a driver initiated action, where a door of the hybrid/electric vehicle transitions from a locked state to an unlocked state or a remote power-up state and/or also occur while the battery pack is in the process of being charged.

According to another aspect of the present disclosure, the plastic heater line is a multilayer line or tube that comprises, consists of, or consists essentially of a thermoplastic inner layer that contacts the fluid and is chemically resistant thereto, a heating element, an insulating layer, and an abrasion resistant outer layer. The heating element may include one or more heatable wires or planar structures located within one or more layers of the lines, inside the orifice created by the lines, or on the outer surface of the lines. When desirable the heating element may include actively heated rods located inside the line.

According to another aspect of the present disclosure, a hybrid/electric vehicle (H/EV) comprises one or more of a battery pack, power electronics, or motor drives and the thermal management system described above and further defined herein. The thermal management system may further comprise a flow control valve that couples the vehicle chassis thermal loop to the component thermal loop, such that closure of the valve allows the vehicle chassis thermal loop and the component thermal loop to operate independently. When desirable, the thermal management system further comprises one or more sensors to measure temperature, pressure, or both; and optionally, one or more of a control unit, fluid connectors, or branches through which fluid may flow around each powertrain component (e.g., battery) or to another thermal system or loop.

According to another aspect of the present disclosure, a method provides for the heating of a powertrain component, such as a battery pack in hybrid/electric vehicles (H/EVs). This method comprises heating a fluid present in a plastic heated line as part of a thermal management system. The heated fluid circulates through a component thermal loop in order to heat the component (e.g., battery pack) to a temperature that is at or above a predetermined cold operating temperature. During operation, the fluid may be heated to a temperature in the range of about 0° C. to about 70° C.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
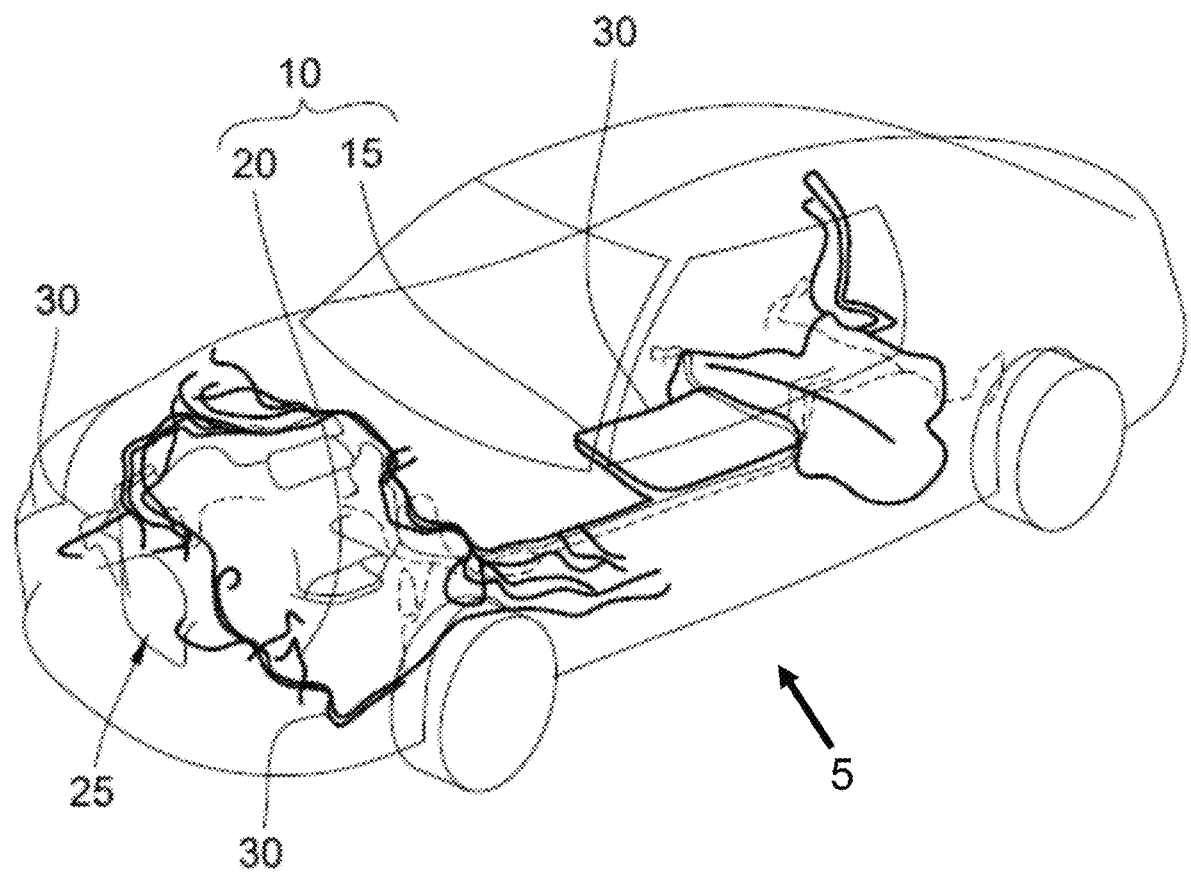
FIG. 1 is a perspective cut-away view of a hybrid electric vehicle (H/EV) highlighting the existence of vehicle chassis, component thermal loops for the battery pack, electronics, and motor drives.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the thermal management system made and used according to the teachings contained herein is described throughout the present disclosure in conjunction with controlling the temperature of a battery pack used in hybrid/electric vehicles (H/EVs), in order to more fully illustrate the composition and the use thereof. The use of this thermal management system to control the temperature in other components, such as power electronics and motor drives, as well as the use of this thermal management system in other types of electric cars, trucks, carts, and cycles, such as plug-in hybrid electric vehicles (PHEVs), extended range electric vehicles (EREVs), full battery electric vehicles (BEVs), as well as spacecraft, space rovers, on- and off-road, railborne, airborne, or seaborne electric vehicles are contemplated to be within the scope of the present disclosure.

The present disclosure provides a thermal management system for use in vehicles, such as a hybrid/electric vehicles (H/EVs) that have a vehicle chassis thermal loop, which includes a fluid, a circulation pump, and one or more lines through which the fluid flows. The thermal management system uses a plastic heated line to heat/or cool a fluid that flows through or around one or more powertrain component, including but not limited to the batteries in the vehicle's battery module or battery pack. In a cold start-up condition, the heated plastic line can begin to heat the static thermal fluid present in the line with vehicle driver door unlock initiation or remote power-up initiation by an external action, such as for example a driver action, and/or can maintain the static fluid in a preheated condition by drawing power while the battery pack is being charged. The heated line(s) may be applied to the vehicle chassis thermal loop bundle at the vehicle pump input from the radiator and pump output to a component thermal loop input.

The thermal management system of the present disclosure can provide for enhanced operating performance efficiency by quickly ensuring that the batteries, electronics, or motor drives are operating in their "comfort zone" or near their optimum operating temperatures. In other words, the thermal management system can precisely control the operating temperature to be within the temperature limits set forth for the powertrain component (e.g., battery cell). In addition, the conversion of conventional aluminum/rubber fluid line to a heated plastic line will provide significant weight savings. Furthermore, heated plastic lines may further enhance chemical compatibility or resistance to chemical degradation, thereby, promoting a longer service lifetime and reducing environmental evaporative emissions.

Referring in more detail to the drawings, FIG. 1 illustrates a hybrid electric vehicle (H/EV) 5 and a thermal management system 10 contained therein formed according to the teachings of the present disclosure. More specifically, the H/EV 5 includes a vehicle chassis thermal loop 20 and a thermal management system 10 comprising a component thermal loop 15. When desirable, the vehicle chassis thermal loop 20 may also incorporate multiple additional thermal loops, including but not limited to a thermal loop for the driveline power electronics 25. Each of the thermal loops 15, 20, 25 may include one or more lines 30 through which a thermal transfer fluid may flow.

Figure 2A:
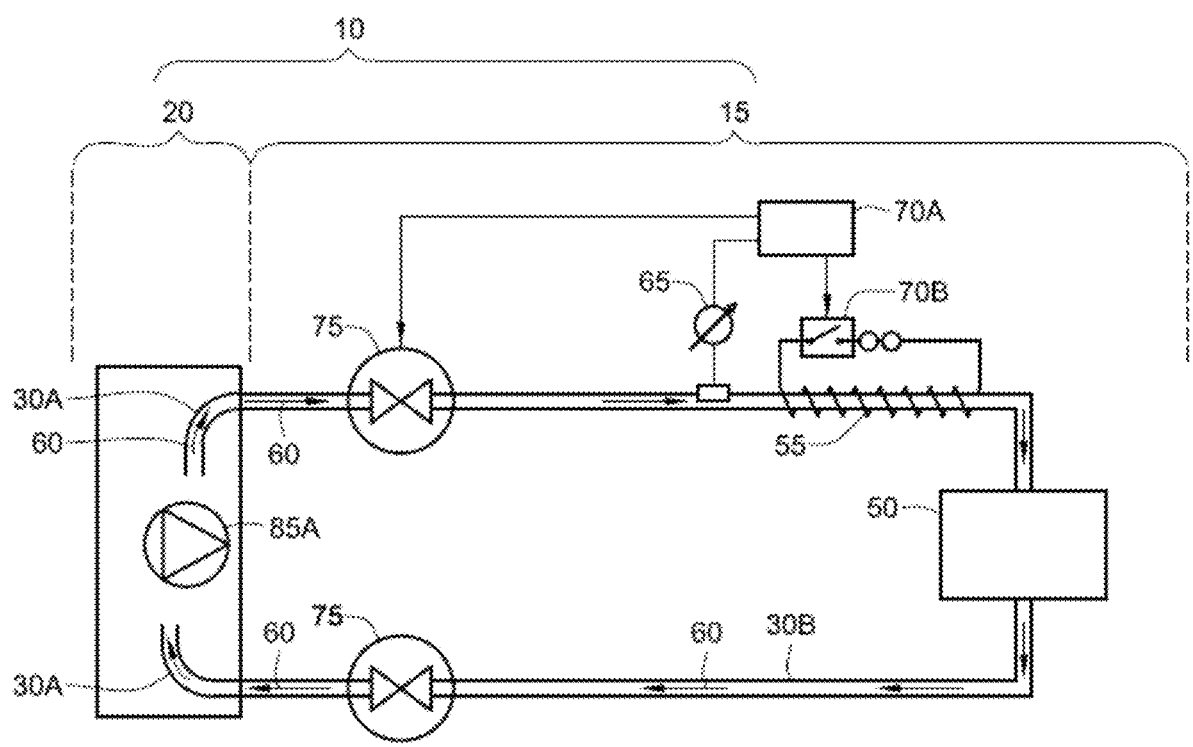
FIG. 2A is a schematic representation of the thermal management system formed according to the teachings of the present disclosure.
Figure 2B:
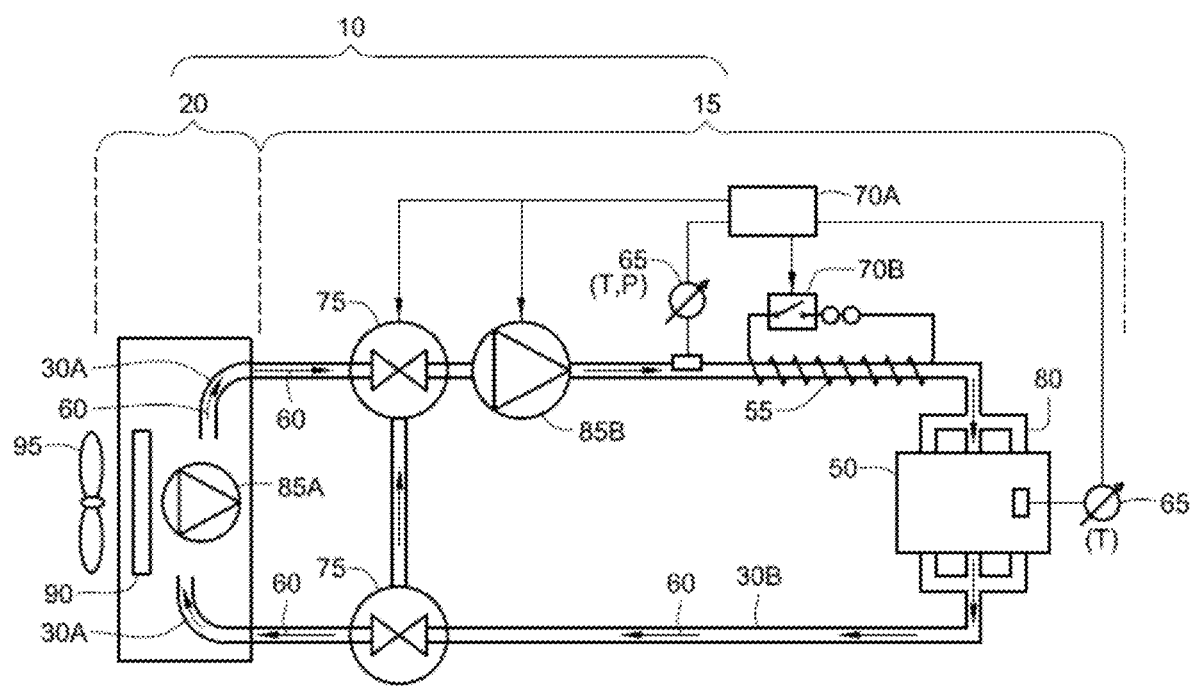
FIG. 2B is a schematic representation of another thermal management system formed according to the teachings of the present disclosure.

Referring now to FIGS. 2A and 2B, thermal management systems 10 formed according to the teachings of the present disclosure are provided for use in a H/EV 5 having a vehicle chassis loop 20. The thermal management systems 10 comprise a component thermal loop 15. The vehicle chassis thermal loop 20 includes a fluid 60, a circulation pump 85A, and one or more lines 30A through which the fluid flows. The component thermal loop 15 comprises the fluid 60 and one or more lines 30B in contact with the powertrain component 50, such as a battery pack, through which the fluid 60 flows. In this respect, the component thermal loop 15 is coupled to the vehicle chassis thermal loop 20. At least one of the vehicle chassis loop 20 and the component thermal loop 15 have at least a portion of the one or more lines 30A, 30B being a plastic heated line 55. The plastic heated line 55 is configured to heat the fluid 60 to a temperature that is at or above a cold operating temperature predetermined for the component 50 (e.g., battery pack). When desirable, the component thermal loop 15 may comprise one or more control units 70A, 70B, sensors 65, and flow control valves 75.

The thermal management system 10 may include one or more control units 70A, 70B. These control units 70A, 70B may be dedicated thermal management systems or be incorporated as part of the vehicle's main control system, thereby reducing manufacturing cost and overall vehicle complexity. The control units 70A, 70B may use a plurality of sensors 65 that are capable of monitoring the temperature and/or pressure within the line 30A, 30B in one or more regions of the thermal loops 15, 20. Control units 70A, 70B, can use the measured temperature values to determine the operation of the various thermal management subsystems.

Referring again to FIG. 2B, the sensors 65 that may be included in the thermal management system 10 may measure either the temperature of the fluid 60, the pressure in the line 30, or both. When desirable, the component thermal loop may also include a circulation pump 85B to assist in flowing the fluid through the system either when the vehicle chassis thermal loop 20 and the component thermal loop 15 are connected in series or are operated independently. The closing of the flow control valves 75 located in the component thermal loop 15 allows the component thermal loop 15 to be operated independently of the vehicle chassis thermal loop 20.

A plurality of sensors 65 may be used to monitor the temperatures of the various components under the control of the thermal management system. For example, the component thermal loop 15 may include one or more temperature sensors 65 that monitor the temperature of the component 50 (e.g., battery pack). Other components and subsystems may also include sensors that monitor the temperature or pressure in the vehicle chassis thermal loop 20. Temperature and/or pressure sensors 570 are generally used to monitor the state of the fluid 60 located in component thermal loop 15.

As shown in FIG. 2B, the fluid line 30B located in the component thermal loop 15 may include multiple branches 80 that allow the fluid 60 to be circulated among the components 50, such as the multiple batteries located within a battery pack. For example, the temperature of the batteries within a battery pack is controlled by the pumping of the fluid (e.g., a thermal transfer medium) through the plurality of branches 80 or conduits integrated into battery pack. These branches may be fabricated from one or more materials that exhibit a relatively high thermal conductivity, are configured within battery pack to optimize thermal contact between the individual batteries (not shown) and the conduits, thereby allowing the temperature of the batteries to be regulated by the flow of fluid through the line 30B. The branches may also allow the fluid to flow to one or more other thermal systems or loops used within the vehicle.

Still referring to FIG. 2B, the thermal management system 10 of the present disclosure may be used to cool or reduce the temperature of the components 50, such as the batteries in a battery pack by regulating the transfer of heat from the fluid 60 to through the vehicle chassis thermal loop 20. In this case, the fluid 60 within the lines 30A is pumped through a radiator 90 using the circulation pump 85A. A blower fan 95 may be used to force air through radiator 90 when the car is stationary or moving at low speeds, thereby, ensuring that there is adequate transfer of thermal energy from the fluid to the ambient environment. The vehicle chassis thermal loop 20 may also include a heater 97, e.g., a PTC heater, that may be used to heat the fluid within lines 30A, and thus heat the component 50 (e.g., the batteries within pack) during the operation of the vehicle.

For the purpose of this disclosure, the terms "battery" and "battery system" may be used interchangeably and refer to an electrical energy storage system that has the capability to be charged and discharged, such as a battery, battery pack, capacitor, or supercapacitor. In addition, these terms may refer to any of a variety of different cell types, chemistries and configurations including, but not limited to, lithium ion (e.g., lithium iron phosphate, lithium cobalt oxide, other lithium metal oxides, lithium ion polymer, nickel metal hydride, nickel cadmium, nickel hydrogen, nickel zinc, silver zinc batteries. The term "battery pack" as used herein refers to multiple individual batteries contained within a housing that are electrically interconnected to achieve a desired voltage and capacity for a particular application.

The term "electric vehicle" as used herein may refer to an all-electric vehicle, also referred to as an EV, a plug-in hybrid vehicle, also referred to as a PHEV, or a hybrid vehicle, also referred to as a H/EV, where a hybrid vehicle refers to a vehicle utilizing multiple propulsion sources one of which is an electric drive system.

The plastic heated line is configured in the thermal management system, such that the heating of the fluid can be initiated when a door of the hybrid/electric vehicle transitions from a locked state to an unlocked state or a remote power-up state by an external initiated action. The plastic line may also be configured for use in preheating the fluid and controlling the temperature of the fluid while the component, e.g., a battery pack, is connected to an external charging station and is being charged. Battery packs in most electric vehicles can be charged through the use of an internal charging system and/or an external charging station. Electric vehicles may be equipped with a charging system that is integrated into the vehicle and charges the battery pack via regenerative braking. In other words, when one drives an electric vehicle, energy flows from the batteries to the wheels via the electric motor, but when one brakes, energy flows from the wheels to the batteries via the motor, which works as an electric generator. Electric vehicles may also be charged by connecting to an external source of electricity via a charging station. In this case, the external electricity may be used to preheat and control the temperature of the fluid present in the heated plastic line.

Figure 3A:
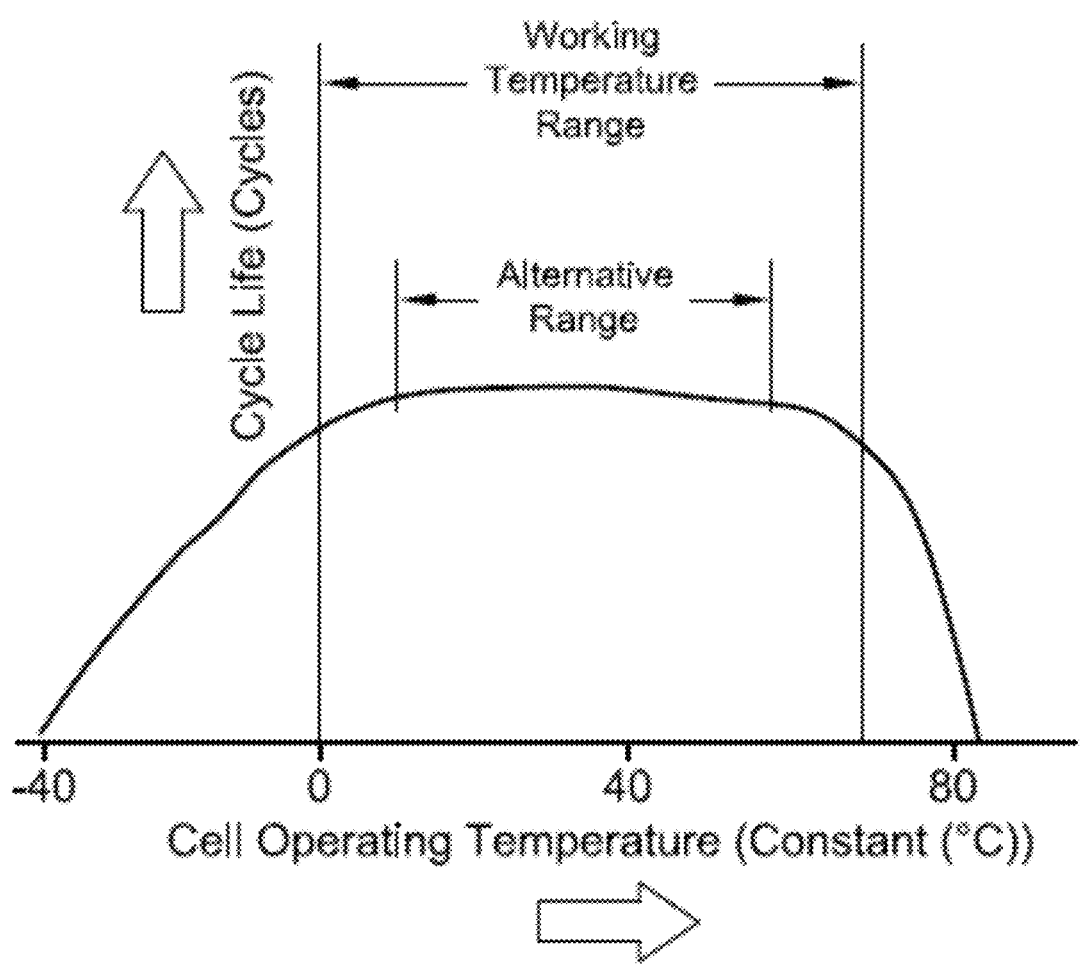
FIG. 3A is a graphical representation of the number of cycle associated with the lifetime of a battery plotted as a function of temperature.
Figure 3B:
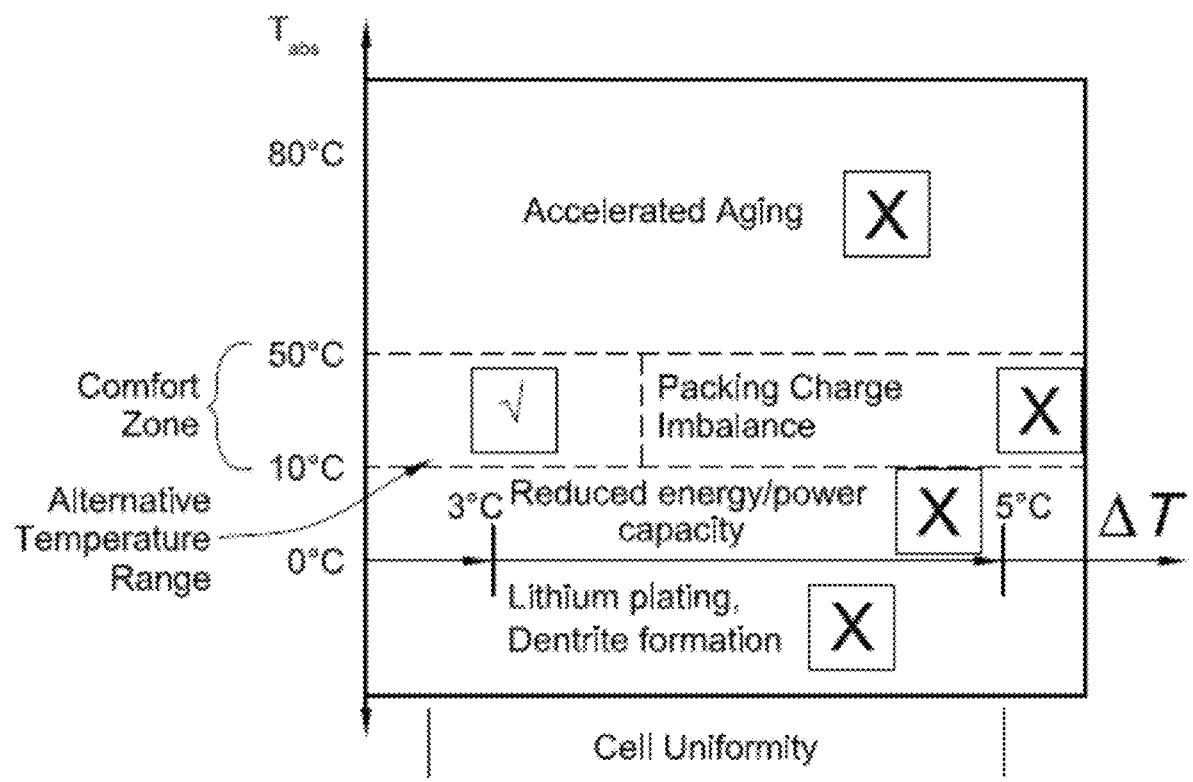
FIG. 3B is a graphical representation of the operating temperature of a battery plotted as a function of the change in temperature across a battery pack.

The performance of rechargeable batteries decreases over time, where performance is provided in terms of either capacity (amp-hour or Ah) or energy capacity (kilowatt-hour or kWh). Referring now to FIG. 3A, the number of cycles in the lifetime of a battery is dependent upon the operating temperature to which the battery or cell is exposed. A slow decrease in the number of cycles for the lifetime of a battery occurs when the operating temperature is below about 0° C. due to the occurrence of slow kinetic behavior. A relatively fast decrease in the number of cycles for the lifetime of a battery occurs when the operating temperature is above about 70° C. due to the occurrence of chemical breakdown. The actual life associated with a battery depends on the cell chemistry and the percentage of time the battery spends within the upper and lower temperature limits of about 0° C. to about 70° C. Alternatively, Referring now to FIG. 3B, a graphical representation of the operating temperature (° C.) plotted as a function of cell uniformity is provided. Accelerated aging occurs when the battery is operated at too high of a temperature (e.g., above about 70° C.). This accelerated aging may also occur when the battery is operated in the range of about 50° C. to about 70° C. When the battery is operated at or below 0° C. degradation of the battery, e.g., lithium plating, dentrite formation, etc. may occur. When the battery is operated at a temperature ranging from 0° C. to about 10° C., the battery exhibits a reduced energy or power capacity. The occurrence of accelerated aging, pack charge imbalance, reduced energy/power capacity, or chemical degradation is undesirable (x). The alternative temperature range, which may be considered the "comfort zone" for the operation of the battery is in the range from about 10° C. to about 50° C. (√). In addition, a minimal change in temperature (ΔT) over the entire battery pack is desirable in order to minimize the occurrence of a charge imbalance occurring in the battery pack. In this respect, the change in temperature over the entire battery pack should be less than 5° C.; alternatively, less than about 4° C.; alternatively between 0° and about 3° C.

The vehicle chassis thermal loop 20 comprises a continuous cooling loop used to cool the hybrid electric vehicle's combustion engine, which is the vehicle's principal traction motor. This cooling loop 20 as previously described in FIG. 2B includes a pump 85A to circulate the fluid 60 through the cooling loop 20, a radiator 90 for discharging the heat to the ambient atmosphere, and a coolant reservoir (not shown). The vehicle chassis thermal loop 20 also includes a fan 95 that forces air through radiator 90 when insufficient air is passing through the radiator, which is necessary to achieve the desired level of cooling, e.g., when the vehicle is not moving. The fluid 60 or heat transfer medium used in this cooling loop may include, but not be limited to, water, an antifreeze coolant, or a mixture thereof. The antifreeze coolant may include without limitation an alcohol, glycerol, ethylene glycol, propylene glycol, organic acid technology (OAT), hybrid organic acid technology (HOAT), or a combination thereof. When desirable, the fluid may include various dyes and other additives. These additives may include, without limitation, sodium silicate, disodium phosphate, sodium molybdate, sodium borate, denatonium benzoate, and dextrin (hydroxyethyl starch), to name a few.

The vehicle chassis thermal loop 20 may be thermally coupled to other vehicle electronic components, for example the power electronics module and inverter for the motor to name a few. If the system includes an internal charging system capable of charging rechargeable batteries using power source at an external charging station, the charging system may be coupled to cooling loop 20 as well. Alternately, such a charging station may be coupled to the battery thermal loop 15.

The component thermal loop 15 comprises one or more components 50, such as power electronics, motor drives, or batteries located in a battery pack, that are in contact with a fluid line 30B and/or multiple branches 80 arising from the fluid line. The fluid line 30B includes the same coolant or heat transfer medium 60 as used in the vehicle chassis thermal loop 20. The fluid 60 may be circulated through the component thermal loop 15 using the pump 85A located in the vehicle chassis thermal loop when the two loops 15, 20 are operated in series. One or more circulation pumps 85B may also be incorporated into the component thermal loop 15 in order to circulate the fluid when desirable and/or when the vehicle chassis thermal loop 20 and the component thermal loop 15 are operated in parallel or independently of one another.

The ability to operate the component thermal loop and the vehicle chassis thermal loop in series or in a parallel configuration, depending upon the external environment and/or the immediate operating characteristics of the components, allows for both thermal and performance optimization of the vehicle's thermal management system. One skilled in the art will understand that such thermal and performance optimization, in turn, contributes to enhanced efficiency along with associated operating cost savings. The decision as operating the thermal loops 15, 20 serially or in parallel can be made in order to optimize the overall thermal response according to the performance operating conditions.

Operating the vehicle chassis thermal loop 20 and the component thermal loop 15 in series may improve system efficiency in a number of operating scenarios. In one example, when the electric vehicle is relatively cold, e.g., after initial start-up from the state of being parked for an extended period of time, serial operation allows the fluid 60 to be heated by the components (e.g., drive train, engine, etc.) in contact with the vehicle chassis thermal loop 15 before passing through or around the component 50, such as a battery pack. In addition, the vehicle chassis thermal loop 20 may also include a heating element 97 as previously described in FIG. 2B. Since rechargeable batteries have a minimum preferred operating temperature, this configuration allows for the heat generated by the components in contact with the vehicle chassis thermal loop 15 to heat the battery pack 50. In a second example, the components that are in contact with the vehicle chassis thermal loop 20 generally operate more efficiently at cooler temperatures. Thus, serial operation may also be beneficial during operation of the vehicle in order to withdraw heat from or around the component (e.g., the battery pack) in order to maintain the component (e.g., batteries) near their optimum or desired operating temperature. A third example occurs when the vehicle chassis thermal loop 20 or the component thermal loop 15 includes the plastic heated line 55. In this case, the plastic heated line may be used to initially heat the fluid 60 to a temperature that is above the lower temperature limit for efficient operation of the component 50, e.g., batteries in the battery pack.

Operating the vehicle chassis thermal loop 20 and the component thermal loop 15 independently or in a parallel fashion may enhance the efficiency of the initial start-up of the vehicle after being parked for an extended time period. When the plastic heated line 55 is located as a portion of the fluid line 30B in the component thermal loop 15, the plastic heated line 55 may be used to initially heat the fluid 60 to a temperature that is above the lower temperature limit for efficient operation of the component 50 (e.g., batteries in the battery pack). In this mode, energy efficiency is enhanced because the fluid 60 is only circulated via the circulation pump 85B through the component thermal loop 15 rather than the entire thermal management system 10.

Figure 4A:
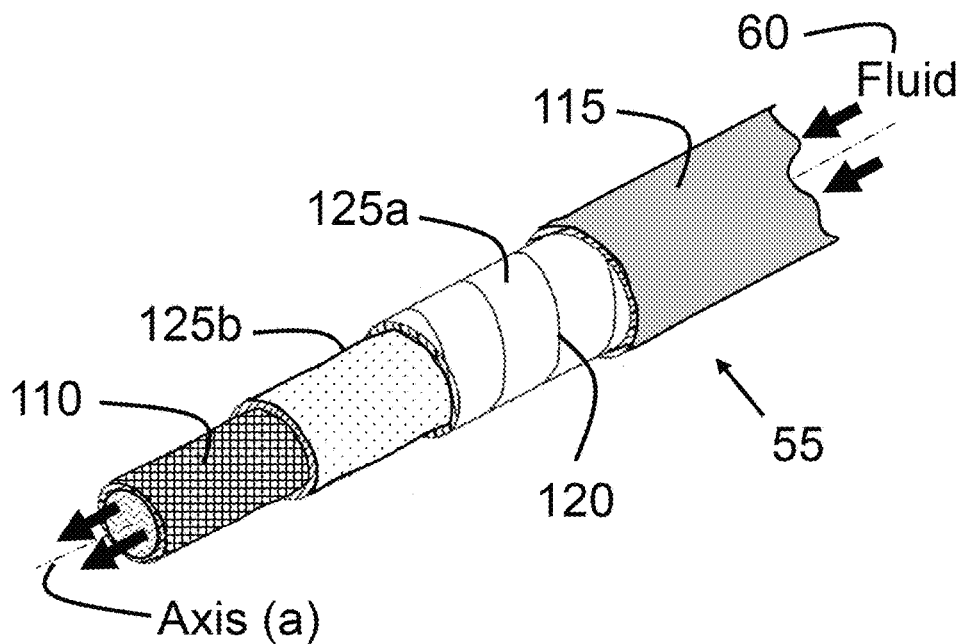
FIG. 4A is a perspective cut-away view of a plastic heated line formed according to the teachings of the present disclosure.
Figure 4B:
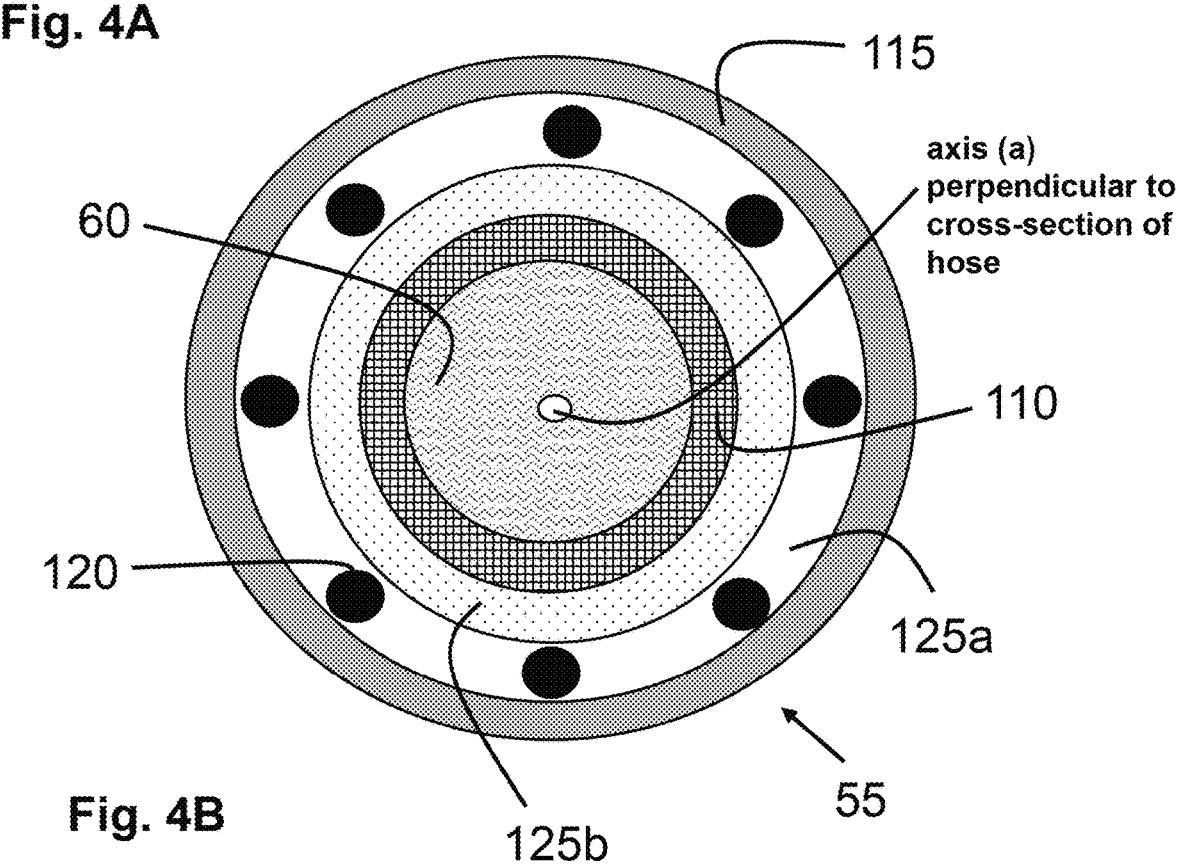
FIG. 4B is a cross-sectional view of another plastic heated line formed according to the teachings of the present disclosure.

Referring now to FIGS. 4A and 4B, the plastic heated line 55 is a multilayer line or tube that comprises a thermoplastic inner layer 110, an abrasive resistant outer layer 115, a heating element 120, and one or more insulating layers 125a, 125b with the composition of each layer being individually selected. In other words, the composition of each layer in the multilayer line may be selected to be substantially the same, similar, dissimilar, or substantially different.

According to one aspect of the present disclosure, the abrasive resistant outer layer 115 surrounds or encompasses the heating element 120 and the other layers 110, 125a, 125b. However, one skilled in the art will understand that the heating element 120 may be applied to the external surface of the outer layer 115 or incorporated within the orifice created by the line through which the fluid flows without exceeding the scope of the present disclosure. In the last two scenarios, the heating element may be encased within its own insulating layer and/or an abrasive resistant out layer. An important design factor for a heatable line 55 is that the heating element 120 is protected by a protective covering (e.g., an insulating layer 110 and/or abrasion resistant outer layer 115). This ensures that the heating element 120 does not come into contact with moisture, which leads to corrosion and the degradation of the heating element 120. Once the plastic heated line 55 is assembled with the line used in the thermal management system, the two ends of the heating element 120 can easily be separated from the plastic line 55 and connected to an electrical connection device, which can be used to connect the heating element 120 to a voltage source.

The heating element 120 is provided for heating the fluid 60 that circulates through the layer 110 of the multilayer line 55. The heating element 120 extends over at least a portion of the plastic heated line 55; alternatively, over a substantial portion of the plastic heated line 55. The length of the plastic heated line 55 may range from about 0.2 meters to about 5 meters; alternatively, between about 0.5 meters and about 4.5 meters; alternatively between about 1 meter and about 4 meters.

According to one aspect of the present disclosure, the heating element 120 may be arranged between the inner layer 110 and the outer layer 115 so that the heating element 120 is fixed in its position within the multilayer line 55. The presence of the one or more insulating layers 125a, 125b may further fix the position of the heating element 120. When desirable, the heating element may be alternatively located so that lies on the outer surface of the line or within the orifice created by the line through which the fluid flows. The heating element 120 may be arranged so that it winds helically around the inner tube (see FIG. 4A) along the longitudinal axis (a) of the inner tube or is located parallel to the axis (see FIG. 4B). The heating element 120 may comprise one or more heatable wires or planar structures located within the plastic heated line 55 or as previously described above applied to the outer surface of the line 55. The heating element may also be located inside the orifice created by the lines. When desirable the heating element may include actively heated rods located inside the line. The heating element 120 may comprise, consist of, or consist essentially of any electrically conductive material, including, but not limited to a conductive polymer, another conductive organic material, a metal, or a metal alloy, such as copper, nickel-plated copper, or tin-plated copper. When desirable, the heating element 120 may comprise multiple wire strands that are twisted or braided together.

The thermoplastic inner layer 110 of the multilayer line 55 is chemically resistant to contact with the fluid 60. Since the plastic heated line 55 transports a fluid 60, the thermoplastic inner layer 110 should be chemically resistant to the fluid 60 and exhibit minimal or no swelling in the presence of the fluid 60. In addition, the thermoplastic inner layer 110 may also be impermeable to the fluid 60. When desirable, the plastic heated line 55 may exhibit flexibility and provide the necessary amount of pressure resistance. Several examples of the thermoplastic materials that may be used for the inner layer include, but are not be limited to acrylonitrile-butadiene-styrene (ABS), polypropylene (PP), polyvinyl chloride (PVC), polyethylene (PE), polybutylene (PB), polyvinylidene fluoride (PVDF), polyamide (PA), ethylene-chlorotrifluoroethylene copolymer (ECTFE), ethylene tetrafluoroethylene (ETFE), fluorinated ethylene propylene (FEP), polycarbonate (PC), polyeitherimide (PEI), polyethylene terephthalate (PET), polymethyl methacrylate (PMMA), polypropylene (PP), tetrafluoroethylene (TFE), styrene acrylonitrile (SAN), polystyrene (PS), polyketone (PK), polyphthalamide (PPA), or a terpolymer of ethylene, tetrafluoroethylene, and hexafluoroethylene (EFEP), as well as mixtures or combinations thereof. The above identified materials may also be used, without limitation, as the composition of the one or more insulating layers 125a, 125b, and/or the outer layer 115. When desirable, the outer layer 115 may also comprise an elastomeric material, including but not limited to a natural or synthetic rubber.

When desirable the thermoplastic inner layer 110, the outer layer 115, and the one or more insulating layers 125a, 125b may comprise one or more additives, such tline commonly incorporated into plastic compositions as curative systems, protective systems, reinforcing agents, cheapeners, pigments, and/or other process aids. These additives may comprise without limitation, any type of pigments or colorants, fillers, dispersants or surfactants, coalescent agents, pH neutralizing agents, plasticizers, defoamers, thickeners, corrosion inhibitors, flame retardants, chelating agents, or crosslinking agents, as well as mixtures and combinations thereof.

Figure 5:
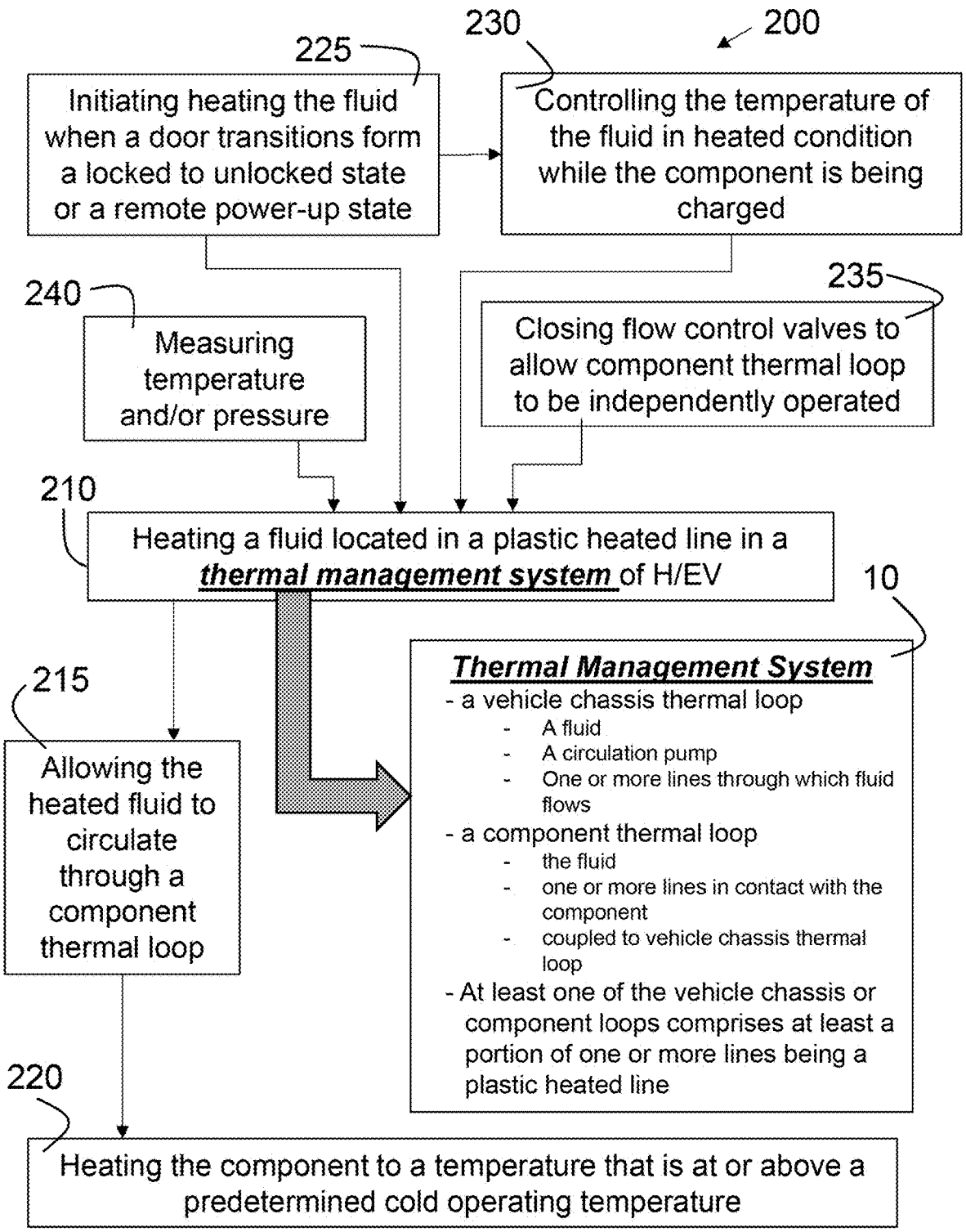
FIG. 5 is a flow chart describing a method of heating a powertrain component, such as a battery pack, power electronics, or motor drives in a hybrid/electric vehicle (H/EV) according to the teachings of the present disclosure.

Referring now to FIG. 5, a method 200 of heating a component, such as a battery pack, in a hybrid/electric vehicle (H/EV) is provided. This method 200 generally comprises heating a fluid 210 located in a plastic heated line present in a thermal management system of the H/EV and allowing the heated fluid to circulate 215 through a component thermal loop, and heating 220 the component (e.g., battery pack) to a temperature that is at or above a cold operating temperature predetermined for the component. The fluid may be heated to a temperature that is in the range of about 0° C. to about 70° C. The thermal management system 10 used in this method is the same as that previously described above and further defined herein. The heating 210 of the fluid may be either initiated when a door of the hybrid/electric vehicle transitions 225 from a locked state to an unlocked state or remote power-up state by an externally initiated action, including without limitation an action by the driver, and/or used for controlling 230 the temperature of the fluid in a heated condition while the component (e.g., battery pack) is being charged. When desirable, the method 200 may further comprise closing 235 a flow control valve that couples the vehicle chassis thermal loop to the component thermal loop, such that the vehicle chassis thermal loop and the component thermal loop operate independently. In addition, the method may also comprise measuring 240 temperature and/or pressure at one or more locations within the thermal management system.

According to another aspect of the present disclosure, a hybrid/electric vehicle is disclosed (see FIG. 1) that includes the thermal management system previously described above (see FIGS. 2A-4B) and further defined herein. In addition, the use of the this thermal management system in a hybrid/electric vehicle is described along with the use of the method of heating a component, e.g., battery pack, in order to more easily start a hybrid/electric vehicle under cold ambient temperatures.

For the purpose of this disclosure, the terms "about" and "substantially" are used herein with respect to measurable values and ranges due to expected variations known to tline skilled in the art (e.g., limitations and variability in measurements).

The recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

The terms "at least one" and "one or more of" an element are used interchangeably and may have the same meaning. These terms, which refer to the inclusion of a single element or a plurality of the elements, may also be represented by the suffix "(s)" at the end of the element. For example, "at least one sensor", "one or more sensors", and "sensor(s)" may be used interchangeably and are intended to have the same meaning.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined in the present disclosure in the broadest sense, superseding any other implied definitions hereinbefore or hereinafter unless expressly asserted in the present disclosure to the contrary, to mean one or more elements selected from the group comprising A, B, . . . and N. In other words, the phrases mean any combination of one or more of the elements A, B, . . . or N including any one element alone or the one element in combination with one or more of the other elements, which may also include, in combination, additional elements not listed.

Within this specification, embodiments have been described in a way which enables a clear and concise specification to be written, but it in intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following aspects:

Aspect 1—A thermal management system for a hybrid/electric vehicle (H/EV) having a vehicle chassis thermal loop including a fluid, a circulation pump, and one or more lines through which the fluid flows. The thermal management system comprises a component thermal loop comprising the fluid and one or more lines in contact with a portion of the component through or around which the fluid flows wherein the component thermal loop is coupled to the vehicle chassis thermal loop; and at least one of the vehicle chassis thermal loop and component thermal loop having at least a portion of the one or more lines being a plastic heated line. The plastic heated line is configured to heat the fluid to a temperature that is at or above a cold operating temperature predetermined for the component.

Aspect 2—The thermal management system of Aspect 1, wherein the plastic heated line is configured, such that the heating of the fluid is initiated by an externally initiated action where the vehicle transitions from a locked state to an unlocked state or a remote power-up state and/or is used to control the temperature of the fluid while the component is being charged.

Aspect 3—The thermal management system of any of Aspects 1 or 2, wherein the plastic heated line is a multilayer line comprising: a thermoplastic inner layer; a heating element; an insulating layer; and an abrasive resistant outer layer. The thermoplastic inner layer is chemically resistant to contact with the fluid.

Aspect 4 The thermal management system of Aspect 3, wherein the thermoplastic inner layer comprises acrylonitrile-butadiene-styrene (ABS), polypropylene (PP), polyvinyl chloride (PVC), polyethylene (PE), polybutylene (PB), polyvinylidene fluoride (PVDF), polyamide (PA), ethylene-chlorotrifluoroethylene copolymer (ECTFE), ethylene tetrafluoroethylene (ETFE), fluorinated ethylene propylene (FEP), polycarbonate (PC), polyetherimide (PEI), polyethylene terephthalate (PET), polymethyl methacrylate (PMMA), polypropylene (PP), tetrafluoroethylene (TFE), styrene acrylonitrile (SAN), polystyrene (PS), polyketone (PK), polyphthalamide (PPA), or a terpolymer of ethylene, tetrafluoroethylene, and hexafluoroethylene (EFEP).

Aspect 5—The thermal management system of any of Aspects 3 or 4, wherein the heating element comprises one or more heatable wires, planar structures, or rods located within the lines, inside the orifice created by the lines, or on the outer surface of the lines.

Aspect 6—The thermal management system of any of Aspects 1-5, wherein the thermal management system further comprises a flow control valve that couples the vehicle chassis thermal loop to the component thermal loop, such that closure of the valve allows the vehicle chassis thermal loop and the component thermal loop to operate independently.

Aspect 7—The thermal management system of any of Aspects 1-6, wherein the thermal management system further comprises one or more sensors to measure temperature, pressure, or both; and optionally, one or more of a control unit, fluid connectors, or branches through which fluid is allowed to flow through or around the component or to other thermal systems or loops.

Aspect 8—The thermal management system of any of Aspects 1-7, wherein the plastic heated line is capable of heating the fluid to a temperature in the range of about 0° C. to about 70° C.

Aspect 9—The thermal management system of any of Aspects 1-8, wherein the plastic heated line is present in a length that ranges from about 0.2 meters to about 5 meters.

Aspect 10—The thermal management system of any of Aspects 1-9, wherein the component is a battery located within a battery pack through which the fluid flows.

Aspect 11—A hybrid/electric vehicle (H/EV) having a component, a thermal management system, and a vehicle chassis thermal loop, which includes a fluid, a circulation pump, and one or more lines through which the fluid flows. The thermal management system comprises a component thermal loop comprising the fluid and one or more lines in contact with the component with the component thermal loop being coupled to the vehicle chassis thermal loop; and at least one of the vehicle chassis thermal loop and component thermal loop having at least a portion of the one or more lines being a plastic heated line. The plastic heated line is configured to heat the fluid to a temperature that is at or above a cold operating temperature predetermined for the component.

Aspect 12—The hybrid/electric vehicle of Aspect 11, wherein the plastic heated line is configured, such that the heating of the fluid is initiated with an external action when the vehicle transitions from a locked state to an unlocked state or a remote power-up state, and/or is used to control the temperature of the fluid while the component is being charged.

Aspect 13—The hybrid/electric vehicle of any of Aspects 11 or 12, wherein the plastic heated line is a multilayer line comprising a thermoplastic inner layer; a heating element; an insulating layer; and an abrasive resistant outer layer. The thermoplastic inner layer is chemically resistant to contact with the fluid.

Aspect 14—The hybrid/electric vehicle of any of Aspects 11-13, wherein the thermal management system further comprises one or more sensors to measure temperature, pressure, or both.

Aspect 15—The hybrid/electric vehicle of any of Aspects 11-14, wherein the thermal management system further comprises a flow control valve that couples the vehicle chassis thermal loop to the component thermal loop, such that closure of the valve allows the vehicle chassis thermal loop and the component thermal loop to operate independently.

Aspect 16—The hybrid/electric vehicle of any of Aspects 11-15, wherein the plastic heated line is capable of heating the fluid to a temperature in the range of about 0° C. to about 70° C.

Aspect 17—The hybrid/electric vehicle of any of Aspects 11-16, wherein the plastic heated line is present in a length that ranges from about 0.2 meters to about 5 meters.

Aspect 18—The hybrid/electric vehicle of any of Aspects 11-17, wherein the component is a battery located within a battery pack through which the fluid flows.

Aspect 19—A method of heating a component in a hybrid/electric vehicle (H/EV) having a vehicle chassis thermal loop including a fluid, a circulation pump, and one or more lines through which the fluid flows. The method comprises heating a fluid located in a plastic heated line present in a thermal management system of the hybrid/electric vehicle; allowing the heated fluid to circulate through a component thermal loop; and heating the component to a temperature that is at or above a cold operating temperature predetermined for the component. The thermal management system comprises the component thermal loop comprising the fluid and one or more lines in contact with the component through or around which the fluid flows; the component thermal loop being coupled to the vehicle chassis thermal loop; and at least one of the vehicle chassis thermal loop and component thermal loop having at least a portion of the one or more lines being the plastic heated line.

Aspect 20—The method according to Aspect 19, wherein the heating of the fluid is either initiated when a door of the hybrid/electric vehicle transitions with an external action from a locked state to an unlocked state or a remote power-up state, and/or used to control the temperature of the fluid while the component is being charged.

Aspect 21—The method according to any of Aspects 19 or 20, wherein the fluid is heated to a temperature in the range of about 0° C. to about 70° C.

Aspect 22—The method according to any of Aspects 19-121, wherein the method further comprises closing a flow control valve that couples the vehicle chassis thermal loop to the component thermal loop, such that the vehicle chassis thermal loop and the component thermal loop operate independently.

Aspect 23—The method according to any of Aspects 19-22, wherein the method further comprises measuring temperature and/or pressure at one or more locations within the thermal management system.

Aspect 24—The method according to any of Aspects 19-23, wherein the component is a battery located within a battery pack through which the fluid flows.

Aspect 25—The use of the thermal management system of any of Aspects 1-10 in a hybrid/electric vehicle (H/EV).

Aspect 26—The use of the method of any of Aspects 19-24 to heat a battery pack in order to start a hybrid/electric vehicle.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of heating a component in a hybrid/electric vehicle (H/EV) having a vehicle chassis thermal loop including a fluid, a circulation pump, and one or more lines through which the fluid flows, the method comprising
heating a fluid located in a plastic heated line present in a thermal management system of the hybrid/electric vehicle;
allowing the heated fluid to circulate through a component thermal loop; and
heating the component to a temperature that is at or above a cold operating temperature predetermined for the component;
wherein the thermal management system comprises:
the component thermal loop comprising the fluid and one or more lines in contact with the component through or around which the fluid flows; the component thermal loop being coupled to the vehicle chassis thermal loop; and
at least one of the vehicle chassis thermal loop and component thermal loop having at least a portion of the one or more lines being the plastic heated line.

2. The method according to claim 1, wherein the heating of the fluid is either initiated when a door of the hybrid/electric vehicle transitions with an external action from a locked state to an unlocked state or a remote power-up state, and/or used to control the temperature of the fluid while the component is being charged.

3. The method according to claim 1, wherein the fluid is heated to a temperature in the range of about 0° C. to about 70° C.

4. The method according to claim 1, wherein the method further comprises closing a flow control valve that couples the vehicle chassis thermal loop to the component thermal loop, such that the vehicle chassis thermal loop and the component thermal loop operate independently.

5. The method according to claim 1, wherein the method further comprises measuring temperature and/or pressure at one or more locations within the thermal management system.

6. The method according to claim 1 wherein the component is a battery located within a battery pack through which the fluid flows.

7. The use of the thermal management system of claim 1 in a hybrid/electric vehicle (H/EV).

8. The use of the method of claim 1 to heat a battery pack in order to start a hybrid/electric vehicle.

* * * * *